(12) United States Patent
Neufeld

(10) Patent No.: US 12,466,990 B2
(45) Date of Patent: Nov. 11, 2025

(54) WATER-BASED ANIONIC FRICTION REDUCER

(71) Applicant: Obsidian Chemical Solutions, LLC, Midland, TX (US)

(72) Inventor: John Neufeld, Midland, TX (US)

(73) Assignee: Obsidian Chemical Solutions, LLC, Midland, TX (US)

( * ) Notice: Subject to any disclaimer, the term of this patent is extended or adjusted under 35 U.S.C. 154(b) by 0 days.

(21) Appl. No.: 18/336,740

(22) Filed: Jun. 16, 2023

(65) Prior Publication Data

US 2023/0407164 A1 Dec. 21, 2023

Related U.S. Application Data

(60) Provisional application No. 63/352,792, filed on Jun. 16, 2022.

(51) Int. Cl.
| | |
|---|---|
| *C09K 8/68* | (2006.01) |
| *C09K 8/03* | (2006.01) |
| *C09K 8/12* | (2006.01) |
| *C09K 8/62* | (2006.01) |
| *C09K 8/88* | (2006.01) |

(52) U.S. Cl.
CPC .............. *C09K 8/68* (2013.01); *C09K 8/03* (2013.01); *C09K 8/12* (2013.01); *C09K 8/62* (2013.01); *C09K 8/882* (2013.01); *C09K 2208/28* (2013.01)

(58) Field of Classification Search
CPC ... C09K 8/03; C09K 8/12; C09K 8/62; C09K 8/68; C09K 8/882; C09K 2208/28
See application file for complete search history.

(56) References Cited

U.S. PATENT DOCUMENTS

| | | | | |
|---|---|---|---|---|
| 5,783,628 | A  * | 7/1998 | Yada ........................ | C08F 8/44 525/61 |
| 2014/0262283 | A1 * | 9/2014 | Savari ................... | E21B 36/001 166/305.1 |
| 2016/0289549 | A1 * | 10/2016 | Nelson ...................... | C09K 8/76 |
| 2021/0017843 | A1 * | 1/2021 | Chopade ................ | C09K 8/665 |
| 2023/0322977 | A1 * | 10/2023 | Dawson .................. | C08F 22/38 524/428 |

* cited by examiner

*Primary Examiner* — James C Goloboy
(74) *Attorney, Agent, or Firm* — Braxton Perrone, PLLC; Bobby W. Braxton; Gregory Perrone

(57) ABSTRACT

A system and method for manufacturing and using a water-based friction reducer. The anionic water-based friction reducer is environmentally friendly. It results in long term stability with no separation or solid sediments. It is also less expensive than oil-based friction reducing liquids. The water-based friction reducing liquid has water, a suspension polymer, an inorganic salt, an amide, and a dispersant. The water-based friction reducing liquid can replace oil-based friction reducing liquids.

6 Claims, 3 Drawing Sheets

WATER-BASED ANIONIC FRICTION REDUCER

PRIORITY

The present invention claims priority to U.S. Provisional Application 63/352,792, filed Jun. 16, 2022, the entirety of which is hereby incorporated by reference.

BACKGROUND OF THE INVENTION

Technical Field

The present invention relates to a system and method for a water-based friction reducer.

Description of Related Art

There are a variety of friction reducing fluids. Each has their own advantages and disadvantages. Consequently, there is a need for a friction reducing fluid which offers comparatively greater advantages.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

A friction reducing liquid ("FRL") has many different uses. It can be used in drilling, hydraulic fracturing, stimulation, workover and production operations.

One embodiment of a FRL will be described which has a water-based package. In one embodiment the water-based FRL contains no mineral oil, petroleum distillates, diesel, kerosene, or surfactants. As such, the water-based FRL is environmentally friendly compared to oil based FRL's. Thus, one embodiment describes an anionic water-based FRL. In such embodiments, rather than using oil as the delivery mechanism, water is utilized.

The water-based FRL, in one embodiment, has superior proppant suspension performance and dispenses easily with no addition of inverting surfactants, which are often needed in invert-emulsions and oil based FRL's. The water-based FRL has long term stability with no separation or solid sediments. This reduces cost, increasing performance, and benefits the environment. In one embodiment long term stability refers to a FRL which can be used at least 6 months after manufacturing.

In one embodiment the water-based FRL is an anionic polyacrylamide friction reducer slurry which is delivered in a water-based suspension package. The water-based FRL is easily pumpable and obtains maximum hydration quickly in frac water. It is effective in fresh-water and moderate Total dissolved solids (TDS) waters.

Despite all of the environmental advantages, the water-based FRL performs competitively to prior art dry powder units. One benefit of not using a dry powder unit is the elimination of the added equipment which was previously required on the frac site. This is a direct reduction in capital cost as well as the required footprint on site, which is always at a premium. Additionally, because extra equipment was required for the delivery of powder, this equipment often resulted in downtime. Further, the powder, when it becomes wet without proper precautions, can turn into a gum or slime. When this happens, the product does not work as intended and must be discarded. Thus, using a water-based delivery system, as opposed to delivering via powder, eliminates or decreases these disadvantages. A water-based system requires less capital equipment and less footprint to deliver.

The water-based FRL can be applied as it typical with other FRL's. In one embodiment the water-based FRL is used at a rate of 0.25-3.0 gallon per thousand (gpt) for slickwater fracturing or in coiled tubing applications. The water-based FRL can be used in freshwater to mid brines in turbulent flow to reduce pressure.

Figure 1:
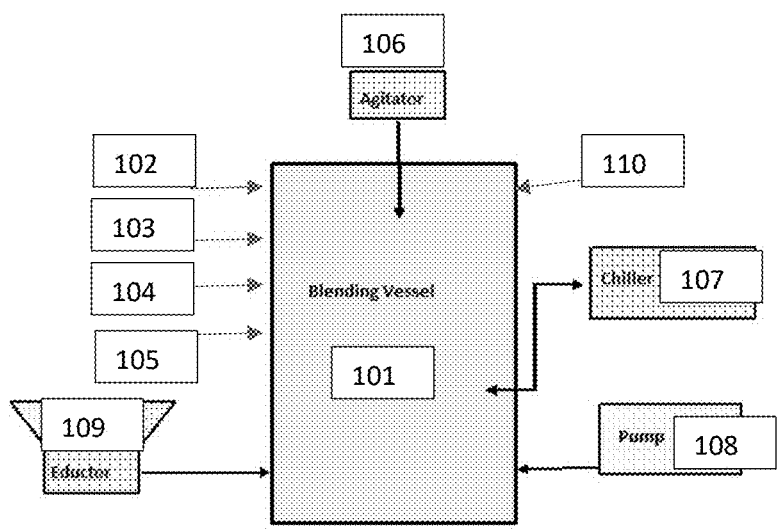
FIG. 1 is a schematic of a mixing tank in one embodiment.

Turning to FIG. 1, FIG. 1 is a schematic of a mixing tank in one embodiment. FIG. 1 shows a mixing tank 101. While a batch schematic is shown, this is for the sake of simplicity. Other methods including semi-batch and continuous can likewise be utilized.

The mixing tank 101 can have the necessary supporting equipment pressure and temperature sensors and other such equipment. These are not depicted for the sake of clarity, but these and other operational and monitoring equipment can be utilized.

Depicted in FIG. 1 is an agitator 106 which can mix and agitate the tank. This provides a homogenous mixture. Also shown is a chiller 107 which can ensure the tank 101 operates at the desired temperature. As noted, in one embodiment the temperature is monitored and lowered as necessary to prevent undesirable cooking. In some embodiments, not shown, the system will further comprise a heater to add heat when necessary.

The system also has a pump 108. The pump 108 can be used to circulate the tank 101 to further enhance mixing. It can also be used to direct product as necessary. Finally, the system includes an eductor 105.

In one embodiment the method of making a water-based friction reducing liquid comprises the following steps:
 a) adding water to a tank;
 b) adding a suspension polymer to the tank;
 b) adding an inorganic salt to said tank to form a mixture;
 c) adding a dispersant;
 d) stirring the mixture;
 e) cooling the mixture;
 f) adding an amide;
 g) mixing to form a water-based friction reducing liquid.

In one embodiment the order of the steps can be modified, but in other embodiments the steps must be completed in this specified order. Further, steps such as mixing, stirring, pumping etc. have not always been explicitly described.

Water 103 is added to the tank. The water serves as the carrier and is used in lieu of oil or other carriers, as discussed in more detail herein. The amount of water 103 added will depend, in part, on the amounts and formulation of the liquid. In one embodiment, water comprises between 40-50%, by weight, of the formulation. Unless otherwise specified, the percentages given are by weight.

As shown in FIG. 1, a suspension polymer 102 is added to the tank. Water 103 and/or polymer 102 is added until the polymer 103 is fully dispersed and hydrated.

Various suspension polymers 102 can be added. In one embodiment the suspension polymer comprises xanthan. This is for illustrative purposes only and should not be deemed limiting. In one embodiment xanthan comprises between about 0-1% of the final formulation by weight. In one embodiment xanthan comprises between about 0.1-1% of the final formulation by weight.

The suspension polymers 102 act to stabilize the formulation. As noted, in one embodiment the formulation is stable, meaning it can be used for the desired purpose, greater than 6 months after being manufactured. The suspension polymers 102 provide the necessary short term and long-term stabilization.

Thereafter a salt 104 is mixed until it is dissolved. In one embodiment the salt 104 is an inorganic salt. In one specific embodiment the inorganic salt 104 comprises calcium chloride anhydrous. This specific salt is provided for illustrative purposes only and should not be deemed limiting. In one embodiment the salt comprises between about 30-40% by weight of the final formulation.

The salt 104 acts as an inhibitor for the amide 105. Absent an inhibitor the water hydrates the amide 105. This results in an undesirable slime, as noted. The product does not work as intended, can gum up equipment, and needs to be discarded. The salt 104 has the benefit of inhibiting the hydration of the amide 105.

In one embodiment the formulation further comprises a dispersant 110. A dispersant 110 reacts with the water and the salt and prevents the amide 105 from activating. If the amide 105 were to activate, the product could create an undesirable gummy gel. The dispersant 110 prevents this from occurring. The dispersant 110 can comprise various dispersants 110 which prevent the amide 105 from activating. In one embodiment the dispersant 110 is a poly vinyl polymer. The amount of dispersant needed will depend upon the formulation, the type of dispersant, etc. In one embodiment wherein the dispersant is a polyvinyl polymer, the dispersant comprises between about 0-1% of the final formulation. In one embodiment, the dispersant comprises between about 0.1-1% of the final formulation.

In one embodiment the dispersant 110 is added after the salt and is activated at a temperature of about 160° F. The dispersant 110 is added prior to the addition of the amide 105. In one embodiment the dispersant 110 is added right after the salt. Often adding salt results in an exothermic reaction. Thus, the mixture created thus far will typically increase in temperature. In some embodiments an activation temperature of about 160° F. is needed to activate the polyvinyl. In some cooler climates, the addition of the salt by itself will not reach the necessary activation temperature. In such embodiments, a heater can provide the necessary heat to reach the activation temperature.

Once the activation temperature is reached, the mixture is cooled to about ambient temperature, or to a temperature of between 70-90° F.

Next, an amide 105 is added. In one embodiment the amide 105 comprises a polyethylene with amide substituents. In one embodiment this comprises polyacrylamide powder. The amide 105, such as polyacrylamide powder, is mixed until fully dispersed. In one embodiment the amide 105 comprises between about 15-20% of the final formulation by weight.

The amide 105, in one embodiment, provides the friction reducing qualities. The water 103 is the delivery mechanism which delivers the amide 105.

Figure 2:
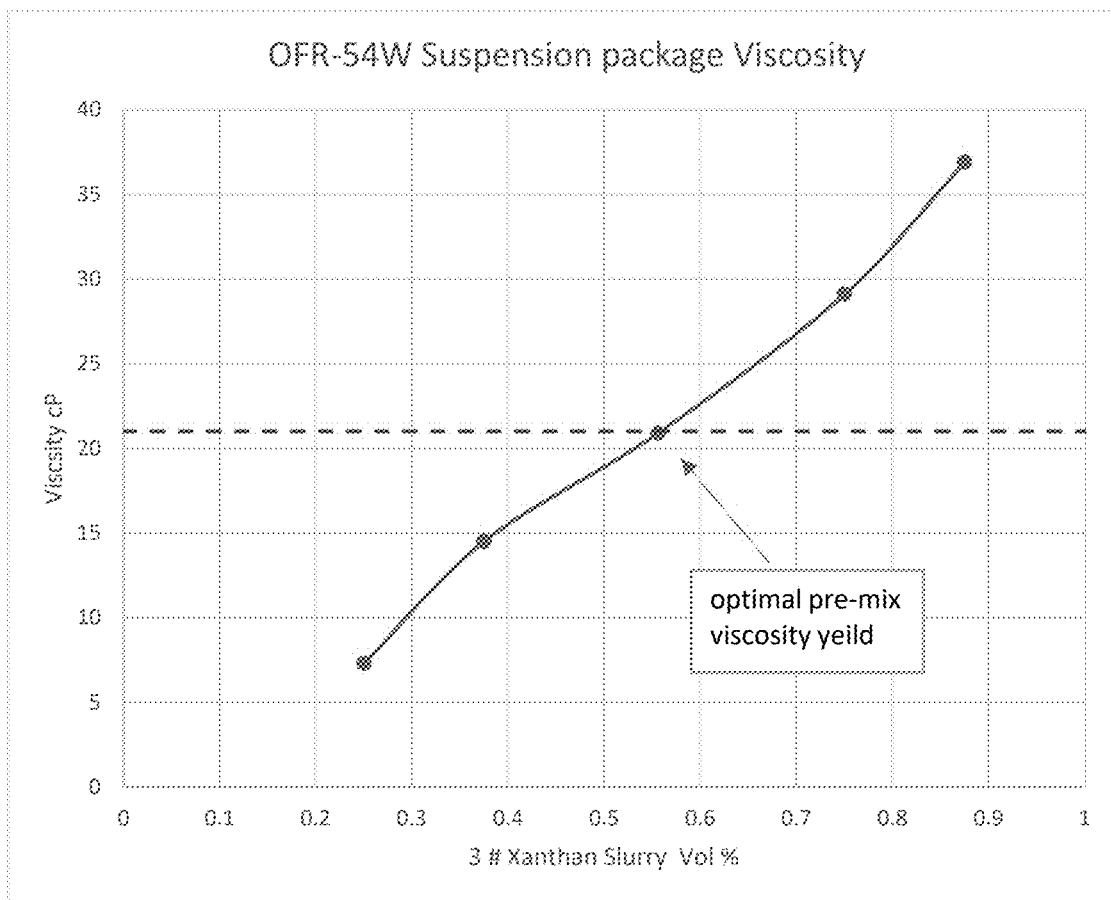
FIG. 2 is as chart showing viscosity of the FRL in one embodiment.

FIG. 2 is a chart showing viscosity of the FRL in one embodiment. Various concentration of xanthan slurries as the suspension polymer 102 are shown with their respective resulting viscosity. In the embodiment shown the optimal pre-mix viscosity yield had a volume percentage of between 0.5 and 0.6 xanthan slurry. This concentration resulted in a suitable viscosity for the FRL.

Figure 3:
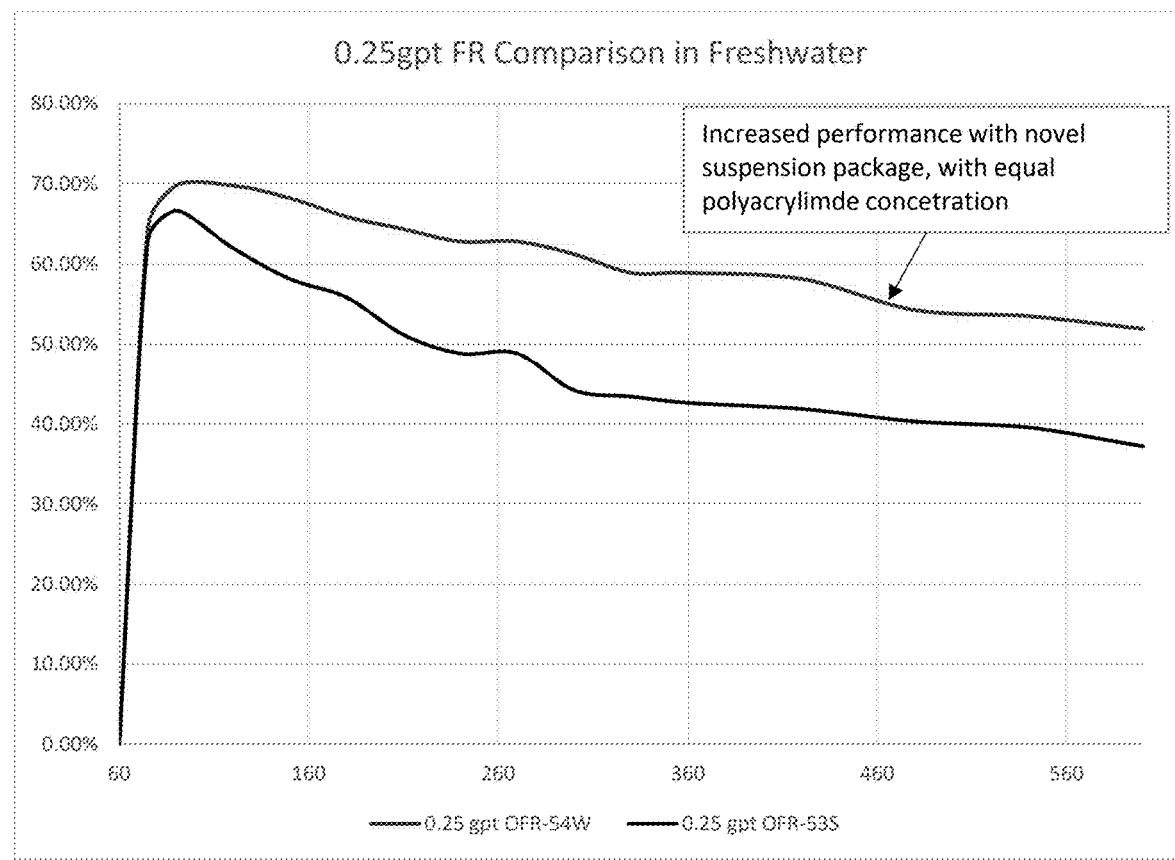
FIG. 3 depicts a chart showing performance of various FRLs in one embodiment.

FIG. 3 depicts a chart showing performance of various FRLs. The bottom line is an oil-based FRL (OFR-53S). The upper line is a water-based FRL (OFR-54W). Both FRLs had the same amount of amide 105, in this case polyacrylamide. Further, the same amount was added (0.25 gpt). As can be seen, despite having the same amount of polyacrylamide, the water-based FRL reached 70% friction reduction quicker than the oil-based FRL. Further, as can be seen, it maintained a comparatively higher percentage of friction reduction than the oil-based FRL. Thus, the water-based FRL had superior performance compared to the oil-based FRL.

A water-based FRL has several benefits when compared to an oil-based FRL. First, water is considerably less expensive than oil. Thus, a water-based FRL is less expensive than an oil-based FRL. Second, the price of oil changes constantly. Thus, the price of an oil-based FRL fluctuates considerably with the cost of oil. A water-based FRL allows for more consistent pricing, as well as lower pricing. Third, as shown above, a water-based FRL outperforms the more expensive oil-based FRL. Fourth, the water-based FRL is more economically friendly than an oil-based FRL. This results in a cheaper, better performing, and more economically friendly solution compared to an oil-based FRL.

While one embodiment has been described wherein the solution is used as a FRL, in one embodiment the system has other uses. As but one example, in one embodiment, the formulation can be used in a mining or other such industry as water treatment. In some embodiments the amide, such as the polyacrylamide, acts as a flocculant. This separates contaminants from the water. Thus, clean water will be on top and the undesirably contaminants would sink to the bottom. Thus, the formulation disclosed herein can be used as a water clarification and water treatment.

While the invention has been particularly shown and described with reference to a preferred embodiment, it will be understood by those skilled in the art that various changes in form and detail may be made therein without departing from the spirit and scope of the invention.

What is claimed is:

1. A method of making a friction reducing liquid, said method comprising the steps of:
    a) adding water;
    b) adding a suspension polymer, wherein said suspension polymer is a xanthan slurry, and wherein said suspension polymer stabilizes the system;
    c) adding an inorganic salt to form a mixture, wherein said inorganic salt comprises calcium chloride anhydrous;
    d) adding a dispersant after adding said inorganic salt and obtaining a temperature of about 160° F.;
    e) cooling said mixture in a chiller to a temperature of between 70° F.-90° F.;
    f) adding an amide after said cooling step, wherein said dispersant reacts with water and said inorganic salt and prevents said amide from activating after said adding, and wherein said amide comprises polyacrylamide powder;

g) mixing to form a water-based friction reducing liquid wherein said friction reducing liquid contains no mineral oil, petroleum distillates, diesel, kerosene, or surfactants and wherein said friction reducing liquid comprises no inverting surfactants.

2. The method of claim 1 wherein said amide comprises a polyethylene with amide substituents.

3. The method of claim 1 wherein said water-based friction reducing liquid comprises about 40-50% by weight water, about 0.1-1% suspension polymer by weight, about 30-40% by weight salt, about 15-20% by weight amide.

4. The method of claim 3 wherein said water-based friction reducing liquid does not comprise oil.

5. The method of claim 1 further comprising adding said water-based friction reducing liquid to a frac liquid.

6. The method of claim 1 wherein said obtaining of step d) comprises heating said mixture to obtain a temperature of about 160° F. prior to said cooling step.

\* \* \* \* \*